(12) United States Patent
Miyada

(10) Patent No.: US 12,114,071 B2
(45) Date of Patent: Oct. 8, 2024

(54) IMAGE PROCESSING APPARATUS, SYSTEM, IMAGE PROCESSING METHOD, AND IMAGE PROCESSING PROGRAM

(71) Applicant: Sony Interactive Entertainment Inc., Tokyo (JP)

(72) Inventor: Naoyuki Miyada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 302 days.

(21) Appl. No.: 17/783,080

(22) PCT Filed: Dec. 3, 2020

(86) PCT No.: PCT/JP2020/045082
§ 371 (c)(1),
(2) Date: Jun. 7, 2022

(87) PCT Pub. No.: WO2021/117606
PCT Pub. Date: Jun. 17, 2021

(65) Prior Publication Data
US 2023/0026930 A1    Jan. 26, 2023

(30) Foreign Application Priority Data
Dec. 11, 2019   (WO) .................. PCT/JP2019/048418

(51) Int. Cl.
*H04N 23/68*   (2023.01)
(52) U.S. Cl.
CPC ....... *H04N 23/683* (2023.01); *H04N 23/6811* (2023.01)

(58) Field of Classification Search
CPC ................. H04N 23/6811; H04N 23/683
See application file for complete search history.

(56) References Cited

U.S. PATENT DOCUMENTS

| | | | |
|---|---|---|---|
| 7,668,447 | B2 | 2/2010 | Yamazaki |
| 8,355,053 | B2 | 1/2013 | Naka |
| 9,467,623 | B2 | 10/2016 | Hyun |

(Continued)

FOREIGN PATENT DOCUMENTS

| | | |
|---|---|---|
| JP | 2003209735 A | 7/2003 |
| JP | 2007189478 A | 7/2007 |

(Continued)

OTHER PUBLICATIONS

Apparatus for User Interface Based on Wearable Computing Environment and Method Thereof; KR20100047793; English Translation (Year: 2010).*

(Continued)

*Primary Examiner* — Cynthia Segura
(74) *Attorney, Agent, or Firm* — Matthew B. Dernier, Esq.

(57) ABSTRACT

An image processing apparatus includes a reception unit that receives an image signal acquired by an image sensor, an acceptance unit that accepts operation input made by a user for driving a device carrying the image sensor, a calculation unit that calculates a movement amount of the image sensor in an entire angle of view according to the image signal and the operation input, and a correction processing unit that performs a correction process for an image constructed from the image signal, according to the movement amount.

17 Claims, 7 Drawing Sheets

(56) References Cited

U.S. PATENT DOCUMENTS

| | | |
|---|---|---|
| 10,237,506 B2 | 3/2019 | Park |
| 10,244,174 B2 | 3/2019 | Mukunashi |
| 10,523,869 B2 | 12/2019 | Takahashi |
| 2007/0166021 A1 | 7/2007 | Yamazaki |
| 2010/0194924 A1 | 8/2010 | Naka |
| 2014/0368712 A1* | 12/2014 | Park ................. H04N 25/745 |
| | | 348/308 |
| 2015/0130954 A1* | 5/2015 | Hyun ................. H04N 23/683 |
| | | 348/208.2 |
| 2018/0220074 A1 | 8/2018 | Mukunashi |
| 2018/0270423 A1 | 9/2018 | Takahashi |

FOREIGN PATENT DOCUMENTS

| | | |
|---|---|---|
| JP | 2008148049 A | 6/2008 |
| JP | 2010183353 A | 8/2010 |
| JP | 2010200307 A | 9/2010 |
| JP | 2018124357 A | 8/2018 |
| KR | 1020100047793 A | 5/2010 |
| KR | 1020140146337 A | 12/2014 |
| KR | 1020150053495 A | 5/2015 |
| KR | 1020180095324 A | 8/2018 |
| WO | 2017086300 A1 | 5/2017 |

OTHER PUBLICATIONS

Office Action for corresponding KR Application No. 10-2022-7023835, 11 pages, dated Oct. 23, 2023.
International Search Report for corresponding PCT Application No. PCT/JP2020/045082, 4 pages, dated Feb. 22, 2021.

* cited by examiner

IMAGE PROCESSING APPARATUS, SYSTEM, IMAGE PROCESSING METHOD, AND IMAGE PROCESSING PROGRAM

TECHNICAL FIELD

The present invention relates to an image processing apparatus, a system, an image processing method, and an image processing program.

BACKGROUND ART

Various methods have hitherto been proposed to correct blurs produced when still images and moving images are formed. For example, PTL 1 discloses an invention relating to a monitoring system that is a monitoring apparatus which allows visual recognition of an obstacle even during nighttime and achieves measurement of traffic flows, invaders, and the like. PTL 1 discloses the invention relating to such a technology that acquires movement information by using a plurality of images and corrects blurs in reference to the acquired movement information.

CITATION LIST

Patent Literature

[PTL 1] Japanese Patent Laid-open No. 2003-209735

SUMMARY

Technical Problem

However, during imaging, blurs are often produced not only by an object to be imaged but also by an imaging device. For example, when a still image or a moving image is formed by an imaging device mounted on a robot, a drone, or the like, it is desirable to make correction by taking into consideration ego-motion, an imaging posture, and the like.

Accordingly, an object of the present invention is to provide an image processing apparatus, a system, an image processing method, and an image processing program capable of forming images in a stable manner in consideration of a movement of an image sensor.

Solution to Problem

Provided according to an aspect of the present invention is an image processing apparatus including a reception unit that receives an image signal acquired by an image sensor, an acceptance unit that accepts operation input made by a user for driving a device carrying the image sensor, a calculation unit that calculates a movement amount of the image sensor in an entire angle of view according to the image signal and the operation input, and a correction processing unit that performs a correction process for an image constructed from the image signal, according to the movement amount.

Provided according to another aspect of the present invention is an image processing apparatus including a reception unit that receives an image signal acquired by an image sensor, an acquisition unit that acquires information indicating a movement of a user that causes a shift of a device that is carrying the image sensor and that is attachable to the body of the user, a calculation unit that calculates a movement amount of the image sensor in an entire angle of view according to the image signal and the information indicating the movement of the user, and a correction processing unit that performs a correction process for an image constructed from the image signal, according to the movement amount.

Provided according to a further aspect of the present invention is a system including an image sensor that acquires an image signal, an acceptance unit that accepts operation input made by a user for driving a device carrying the image sensor, a drive unit that drives the device carrying the image sensor, according to the operation input, and a terminal apparatus, the terminal apparatus including a reception unit that receives the image signal, a calculation unit that calculates a movement amount of the image sensor in an entire angle of view, according to the image signal and the operation input, and a correction processing unit that performs a correction process for an image constructed from the image signal, according to the movement amount.

Provided according to a still further aspect of the present invention is a system including an image sensor that acquires an image signal, an acquisition unit that acquires information indicating a movement of a user that causes a shift of a device carrying the image sensor and attachable to the body of the user, and a terminal apparatus, the terminal apparatus including a reception unit that receives the image signal, a calculation unit that calculates a movement amount of the image sensor in an entire angle of view, according to the image signal and the information indicating the movement of the user, and a correction unit that performs a correction process for an image constructed from the image signal, according to the movement amount.

Provided according to a still further aspect of the present invention is an image processing method including a step of receiving an image signal acquired by an image sensor, a step of accepting operation input made by a user for driving a device carrying the image sensor, a step of calculating a movement amount of the image sensor in an entire angle of view according to the image signal and the operation input, and a step of performing a correction process for an image constructed from the image signal, according to the movement amount.

Provided according to a still further aspect of the present invention is an image processing method including a step of receiving an image signal acquired by an image sensor, a step of acquiring information indicating a movement of a user that causes a shift of a device that is carrying the image sensor and that is attachable to the body of the user, a step of calculating a movement amount of the image sensor in an entire angle of view according to the image signal and the information indicating the movement of the user, and a step of performing a correction process for an image constructed from the image signal, according to the movement amount.

Provided according to a still further aspect of the present invention is an image processing program that causes a computer to perform a function of receiving an image signal acquired by an image sensor, a function of accepting operation input made by a user for driving a device carrying the image sensor, a function of calculating a movement amount of the image sensor in an entire angle of view according to the image signal and the operation input, and a function of performing a correction process for an image constructed from the image signal, according to the movement amount.

Provided according to a still further aspect of the present invention is an image processing program that causes a computer to perform a function of receiving an image signal acquired by an image sensor, a function of acquiring information indicating a movement of a user that causes a shift of a device that is carrying the image sensor and that is attachable to the body of the user, a function of calculating a movement amount of the image sensor in an entire angle of view according to the image signal and the information indicating the movement of the user, and a function of performing a correction process for an image constructed from the image signal, according to the movement amount.

DESCRIPTION OF EMBODIMENTS

Several embodiments of the present invention will hereinafter be described in detail with reference to the accompanying drawings. Note that constituent elements having substantially identical functional configurations in the present description and the drawings are given identical reference signs to omit repetitive explanation.

First Embodiment

Figure 1:
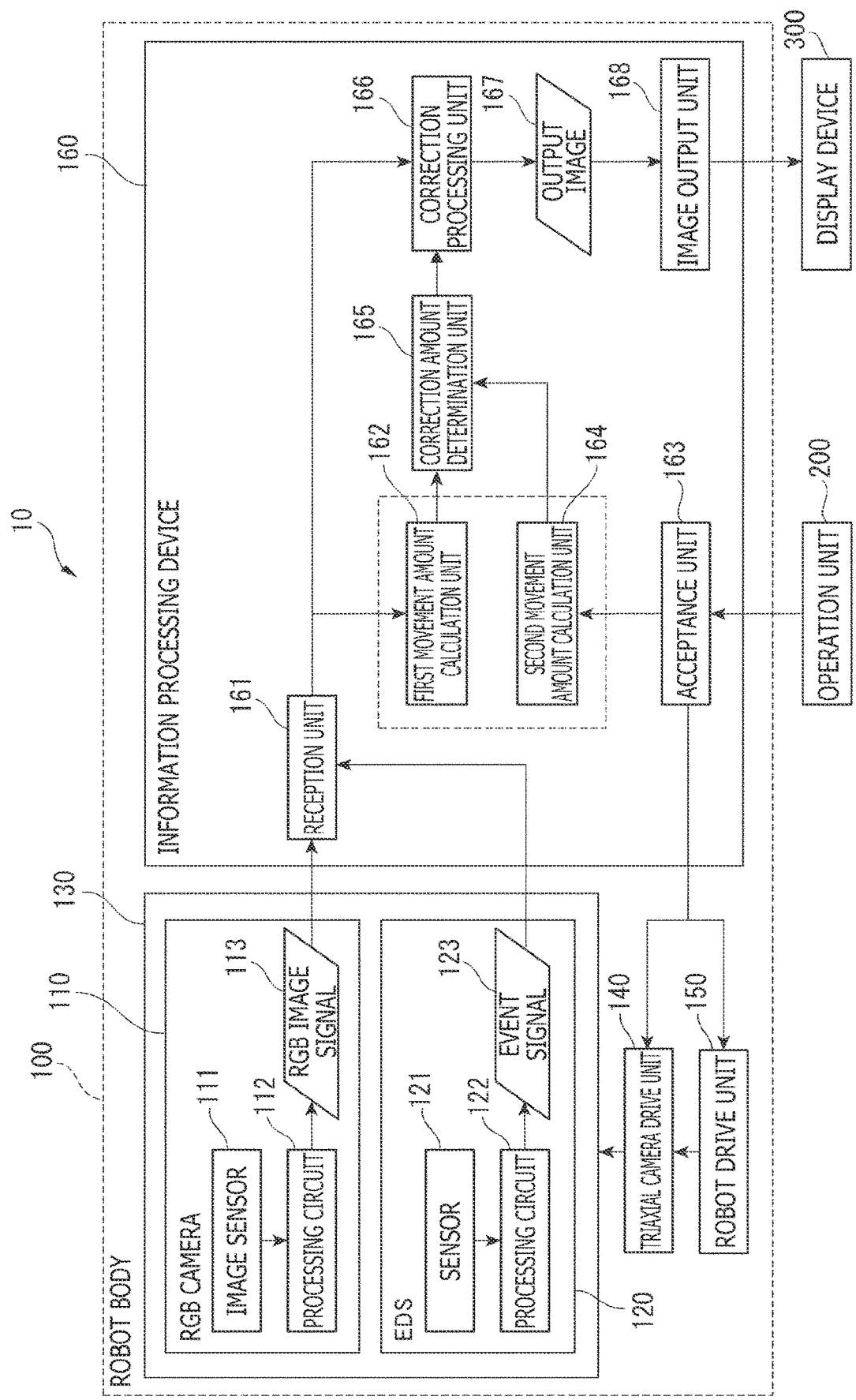
FIG. 1 is a block diagram depicting a schematic configuration of a system according to a first embodiment of the present invention.

FIG. 1 is a block diagram depicting a schematic configuration of a system according to a first embodiment of the present invention. As depicted in FIG. 1, a system 10 includes a robot body 100, an operation unit 200 operated by a user to operate the robot body 100, and a display device 300 which displays images formed by the robot body 100.

The robot body 100 includes a camera unit 130 including an RGB camera 110 and an EDS (Event Driven Sensor) 120, a triaxial camera drive unit 140 for driving the camera unit 130, a robot drive unit 150 for driving the entirety of the robot body 100, and an information processing device 160. Described hereinafter by way of example will be a case where the robot body 100 is a robot imitating a four-legged creature.

The RGB camera 110 includes an image sensor 111 and a processing circuit 112 connected to the image sensor 111. For example, the image sensor 111 generates an RGB image signal 113 by performing synchronous scanning of all pixels in a predetermined cycle or at predetermined timing corresponding to a user operation. For example, the processing circuit 112 converts the RGB image signal 113 into a form suited for storage and transfer. Moreover, the processing circuit 112 gives a time stamp to the RGB image signal 113.

The EDS 120 includes a sensor 121 constituting a sensor array and a processing circuit 122 connected to the sensor 121. The sensor 121 includes light reception elements, and generates an event signal 123 when detecting an intensity change of incident light, more specifically, a luminance change exceeding a predetermined value determined beforehand. The event signal 123 output via the processing circuit 122 includes identification information obtained by the sensor 121 (e.g., pixel position), polarity of a luminance change (increase or decrease), and a time stamp. Moreover, at the time of detection of a luminance change, the EDS 120 is capable of generating the event signal 123 with a considerably higher frequency than the generation frequency of the RGB image signal 113 (a frame rate of the RGB camera 110).

Note that a signal according to which an image can be constructed will be referred to as an image signal in the present description. Accordingly, each of the RGB image signal 113 and the event signal 123 corresponds to an example of the image signal.

According to the present embodiment, the time stamps given to the RGB image signal 113 and the event signal 123 are synchronized with each other. Specifically, for example, time information used for generating the time stamp by the EDS 120 may be supplied to the RGB camera 110 to synchronize the respective time stamps given to the RGB image signal 113 and the event signal 123. Alternatively, in a case where the time information used for generating the time stamp by the RGB camera 110 and the time information used for generating the time stamp by the EDS 120 are supplied independently of each other, an offset amount of each of the time stamps may be calculated with reference to a time at which a specific event (e.g., a change of the object in the entire image) has occurred, to synchronize the respective time stamps given to the RGB image signal 113 and the event signal 123 later.

Moreover, according to the present embodiment, correspondence between the sensor 121 of the EDS 120 and one or a plurality of pixels of the RGB image signal 113 is achieved by a calibration procedure for the RGB camera 110 and the EDS 120 executed beforehand. In this case, the event signal 123 is generated according to a light intensity change at the one or the plurality of pixels of the RGB image signal 113. More specifically, for example, an image of a common calibration pattern is captured by each of the RGB camera 110 and the EDS 120. Thereafter, parameters of correspondence between the camera and the sensor are calculated from respective internal parameters and external parameters of the RGB camera 110 and the EDS 120. In this manner, the sensor 121 is allowed to correspond to the one or the plurality of pixels of the RGB image signal 113.

The robot body 100 is a robot imitating a four-legged creature. Accordingly, the camera unit 130 is mounted on a head portion, and the RGB camera 110 and the EDS 120 generate the RGB image signal 113 and the event signal 123, respectively, to form an image corresponding to a visual field of the robot. In addition, the entirety of the camera unit 130 is driven by the triaxial camera drive unit 140 according to a user operation. Accordingly, the RGB camera 110 and the EDS 120 are simultaneously displaced and rotated as one body together with the camera unit 130.

The triaxial camera drive unit 140 drives the camera unit 130 described above according to a user operation. For example, the triaxial camera drive unit 140 includes a motor, a motor control circuit, an encoder, and others to drive the camera unit 130 in respective rotation directions around three axes constituted by a pitch axis, a roll axis, and a yaw axis. The head portion of the robot for carrying the camera unit 130 is driven by the triaxial camera drive unit 140 in the up-down direction and the left-right direction, and is also rotated in such a direction as to tilt the head portion to the side. Various known technologies are available for a specific configuration of the triaxial camera drive unit 140. Accordingly, this configuration is not described in detail here.

The robot drive unit 150 drives the entirety of the robot body 100 according to a user operation. For example, the robot drive unit 150 includes a motor, a motor control circuit, an encoder, and the like, and drives respective units such as an arm portion and a leg portion of the robot body 100 according to a user operation. Various known technologies are available for a specific configuration of the robot drive unit 150. Accordingly, this configuration is not described in detail here.

Note that the entirety of the camera unit 130 is also displaced and rotated when the entirety of the robot body 100 is driven by the robot drive unit 150 according to a user operation. Accordingly, the RGB camera 110 and the EDS 120 are simultaneously displaced and rotated. For example, this movement includes forward and backward or leftward and rightward shifts of the robot body 100, bending and stretching, jumping, and falling of the leg portions of the robot body 100 in such a manner that the camera unit 130 moves upward and downward, rotation of the entirety of the robot body 100 or a part of the robot body 100 such as the upper half of the body, and others. The displacement and the rotation of the camera unit 130 here are caused not only by intended driving of the robot body 100, but also by shaking of the robot body 100 caused by driving. In this case, blurs are produced in the RGB image signal 113 generated by the RGB camera 110, and also in the event signal 123 generated by the EDS 120.

Described with reference to FIG. 1 again, the information processing device 160 is implemented by a computer which has a communication interface, a processor, and a memory, for example, and includes respective functions of a reception unit 161, a first movement amount calculation unit 162, an acceptance unit 163, a second movement amount calculation unit 164, a correction amount determination unit 165, a correction processing unit 166, and an image output unit 168 each performed by an operation of a processor under a program stored in the memory or received via the communication interface. The functions of the respective units will be further described below.

The reception unit 161 receives the RGB image signal 113 generated by the RGB camera 110 and the event signal 123 generated by the EDS 120.

In the RGB camera 110, the RGB image signal 113 is generated by the image sensor 111 in a predetermined cycle or at a predetermined timing corresponding to a user operation regardless of whether or not luminance changes in a field, and the thus generated RGB image signal 113 is received by the reception unit 161.

In the EDS 120, the event signal 123 is generated by the sensor 121 at a pixel address where the luminance change has occurred as a result of a change of the position of the object in the field or for other reasons, and the thus generated event signal 123 is received by the reception unit 161. Note that the positional change of the object in the field occurs not only by a shift of the moving body in the field but also by a shift of the camera unit 130 itself or a shift of the robot body 100. However, the event signal 123 is insufficient for distinguishing these shifts causing the positional change.

The reception unit 161 supplies both the RGB image signal 113 and the event signal 123 thus received to the first movement amount calculation unit 162, and also supplies only the received RGB image signal 113 to the correction processing unit 166.

The first movement amount calculation unit 162 calculates respective movement amounts of the image sensor 111 and the sensor 121 in the entire angle of view, according to the RGB image signal 113 and the event signal 123 received by the reception unit 161. For example, calculation of the movement amounts in the entire angle of view may be executed by calculating a motion vector with a known method such as a block matching method and a gradient method performed for two RGB image signals 113. On the other hand, in a case of use of the event signal 123, the event signal 123 itself corresponds to the movement amount. Accordingly, the movement amount in the entire angle of view can be calculated from one event signal 123. Note that a movement for which a motion vector is calculated according to the RGB image signal 113 is caused by a shift of the moving body in the field, a shift of the camera unit 130, a shift of the robot body 100, or the like. However, the motion vector calculated from the RGB image signal 113 is insufficient for distinguishing these shifts causing the movement. In addition, as described above, the event signal 123 is also insufficient for distinguishing these shifts causing the movement.

Note that a more detailed movement amount in the entire angle of view may also be calculated by a combination of calculation of the movement amount based on the RGB image signal 113 and calculation of the movement amount based on the event signal 123 described above.

Moreover, a combination of recognition of the object, exclusion of the moving body, and the like may be executed at the time of calculation of the movement amount. For example, in a case where an object which is classified as a human, an animal, or the like by known object recognition performed for the RGB image signal 113 is a moving body highly likely to move, the movement amount is possibly calculated after this part is separated and excluded. In this case, a movement amount of a dominant movement component in the entire angle of view can be calculated by accurate separation of the background.

Moreover, for example, at the time of calculation of the movement amount, an object present in each of successive pixel regions, for each of which the event signal 123 indicates that an event having the same polarity has been caused, may be detected as the moving body described above, and calculation of the movement amount may be executed together with exclusion of the moving body.

As described above, the first movement amount calculation unit 162 calculates a movement amount (shift amount and direction) of the entire angle of view according to the RGB image signal 113 and the event signal 123 received by the reception unit 161, and supplies information indicating the calculated movement amount to the correction amount determination unit 165.

The acceptance unit 163 accepts operation input made by the user to the operation unit 200. This operation input includes input of an operation for driving the camera unit 130, input of an operation for driving the entirety of the robot body 100, and the like. These operations are intentional operations performed by the user for the robot body 100. The acceptance unit 163 supplies information indicating the accepted operation input by the user to the triaxial camera drive unit 140 and the robot drive unit 150, and also to the second movement amount calculation unit 164.

The second movement amount calculation unit 164 calculates the movement amount of each of the image sensor 111 and the sensor 121 produced by the intentional operation of the user, in reference to the information indicating the operation input accepted by the acceptance unit 163. The second movement amount calculation unit 164 calculates the movement amount of each of the image sensor 111 and the sensor 121 by calculating a shift amount, a shift direction, a rotation amount, a rotation direction, or the like of the camera unit 130 produced by the triaxial camera drive unit 140 and the robot drive unit 150, in reference to the information indicating the operation input. For example, when the camera unit 130 is rotated by the triaxial camera drive unit 140, each of the image sensor 111 and the sensor 121 is also basically rotated by the same amount and in the same direction. Moreover, when the robot body 100 is rotated by the robot drive unit 150, for example, each of the image sensor 111 and the sensor 121 is also basically rotated by the same amount and in the same direction. These are also applicable to a case of a shift.

As described above, the information indicating the operation input is information indicating the intentional operation performed by the user. Accordingly, the movement amount calculated by the second movement amount calculation unit 164 indicates only a movement produced by the intentional operation by the user, and hence indicates a movement excluded from targets of a correction process described below. This movement corresponds to a movement of an entire image produced in association with displacement and rotation of the image sensor 111 of the RGB camera 110 and the sensor 121 of the EDS 120.

Specifically, for example, this type of movement is considered to include a movement of rotation of the camera unit 130 as a result of rotation of the head portion of the robot body 100 according to a user operation, a movement for changing each of imaging directions of the image sensor 111 of the RGB camera 110 and the sensor 121 of the EDS 120 as a result of the entirety of the robot body 100 being driven according to a user operation, and others. The second movement amount calculation unit 164 calculates respective movement amounts of a movement caused by a user operation for driving a portion capable of displacing and rotating an image sensor integrated into one body and a movement caused by a user operation for driving the entire apparatus, and supplies information indicating the calculated movement amounts to the correction amount determination unit 165.

Note that the movement amount calculated by the second movement amount calculation unit 164 is not limited to the examples described above. For example, only the movement amount of the camera unit 130 produced by the triaxial camera drive unit 140 may be calculated, or only the movement amount of the camera unit 130 produced by the robot drive unit 150 may be calculated. Moreover, the movement amount calculated by the second movement amount calculation unit 164 may be changed according to movement conditions of the robot body 100. For example, in a case where stable image formation is highly likely to become difficult even in the presence of an intentional operation by the user, the second movement amount calculation unit 164 may be configured not to calculate the movement amount, or to reduce the calculated movement amount.

The correction amount determination unit 165 determines a correction amount of a correction process to be performed by the correction processing unit 166 as described below, by using the movement amounts calculated by the first movement amount calculation unit 162 and the second movement amount calculation unit 164. It is basically desired to achieve a correction for stabilizing a viewing angle at the center of the visual field during image display in the correction process to be performed by the correction processing unit 166 as described below.

Accordingly, the correction amount determination unit 165 determines the correction amount by subtracting the movement amounts of the image sensor 111 and the sensor 121 calculated by the second movement amount calculation unit 164 from the movement amounts of the image sensor 111 and the sensor 121 in the entire angle of view calculated by the first movement amount calculation unit 162. Specifically, the correction amount determination unit 165 determines the correction amount by reducing (or cancelling depending on cases) the movement amount produced by the intentional operation by the user in the movement amounts of the image sensor 111 and the sensor 121 in the entire angle of view calculated by the first movement amount calculation unit 162. Thereafter, the determined correction amount is applied to the correction to allow correction of only a blur produced in the RGB image signal 113 independently of the intention of the user while the intentional operation by the user is being reflected and followed.

In addition, at the time of reduction of the movement amounts of the image sensor 111 and the sensor 121 in the entire angle of view calculated by the first movement amount calculation unit 162, for example, the correction amount determination unit 165 may reduce these movement amounts by simply adding or subtracting a rotation amount for each rotation direction to and from the movement amounts of the image sensor 111 and the sensor 121 in the entire angle of view calculated by the first movement amount calculation unit 162 and the movement amounts of the image sensor 111 and the sensor 121 calculated by the second movement amount calculation unit 164, or by weighting the respective movement amounts in an appropriate manner. These are also applicable to a case of a shift.

As described above, when acceptance of operation input by the acceptance unit 163 and calculation of the second movement amount by the second movement amount calculation unit 164 are performed, the correction amount determination unit 165 determines a correction amount of the correction process to be performed by the correction processing unit 166, according to the movement amounts calculated by the first movement amount calculation unit 162 and the second movement amount calculation unit 164, and supplies the determined correction amount to the correction processing unit 166. On the other hand, in a case where acceptance of operation input by the acceptance unit 163 and calculation of the second movement amount by the second movement amount calculation unit 164 are not performed, the correction amount determination unit 165 determines the correction amount of the correction process to be performed by the correction processing unit 166, according to only the movement amount calculated by the first movement amount calculation unit 162, and supplies the determined correction amount to the correction processing unit 166.

The correction processing unit 166 performs a correction process for the RGB image signal 113 received by the reception unit 161, according to the correction amount determined by the correction amount determination unit 165 and forms an output image 167. The output image 167 is an image formed by designating a blur produced by an intentional operation performed by the user for the camera unit 130 as a blur to be excluded from a correction target and excluding this blur from the correction amount, and by designating a blur produced by entire shaking of the robot body 100 caused by a user operation for actuating the entire apparatus as a correction target and correcting this blur. For example, the correction process performed by the correction processing unit 166 can be executed by using known methods, such as a method which separates a region for each correction direction according to the correction amount determined by the correction amount determination unit 165 and corrects a blur for each region. Moreover, at the time of performance of the correction process by the correction processing unit 166, such correction as what is generally called a blur correction which forms an inverse filter according to the calculated movement amount and corrects a blur by applying the formed inverse filter may be executed together with the correction process.

The image output unit 168 outputs the output image 167 formed by the correction processing unit 166 to the display device 300.

Described with reference to FIG. 1 again, the operation unit 200 is included in the robot body 100, or is connected to the acceptance unit 163 of the information processing device 160 in a wireless or wired manner. According to the present embodiment, for example, the operation unit 200 is what is generally called a controller including a plurality of operators. In this case, the user can drive the entirety of the robot body 100 or the head portion of the robot (camera unit 130) by operating the operation unit 200.

Note that various known configurations are applicable to the operation unit 200. For example, the operation unit 200 may include a pair of controllers each allowed to be gripped by the corresponding one of two hands, a controller allowing character input such as a keyboard, or an application included in a smartphone or the like.

Moreover, a sound recognition technology may be applied to the operation unit 200 and the acceptance unit 163. For example, a microphone or the like may be included in the operation unit 200, and a sound recognition unit may be included in the acceptance unit 163. In this manner, an instruction may be given to the robot body 100 in response to a command uttered from the user, a call given from the user, or the like.

The display device 300 is included in the robot body 100, or is disposed away from the robot body 100 and connected to the image output unit 168 of the information processing device 160 in a wireless or wired manner. For example, the display device 300 is a monitor such as an LCD (Liquid Crystal Display) and an organic EL (Electro Luminescence), and displays an image generated by the robot body 100, to present the image to the user.

Note that various known configurations are applicable to the display device 300. For example, the display device 300 may include a dedicated display device, a display device such as an HMD (Head Mounted Display) attached to the head of the user, a display device of a computer, or a display device of a terminal apparatus such as a smartphone.

Alternatively, the display device 300 may have such a configuration which includes a recording device and records the output image 167 in the recording device in addition to the display of the output image 167 on the display device 300, or such a configuration which eliminates the display device 300 and records the output image 167 in the recording device. This recording device may be included in the robot body 100, or may be disposed away from the robot body 100 and connected to the image output unit 168 of the information processing device 160 in a wireless or wired manner.

Figure 2:
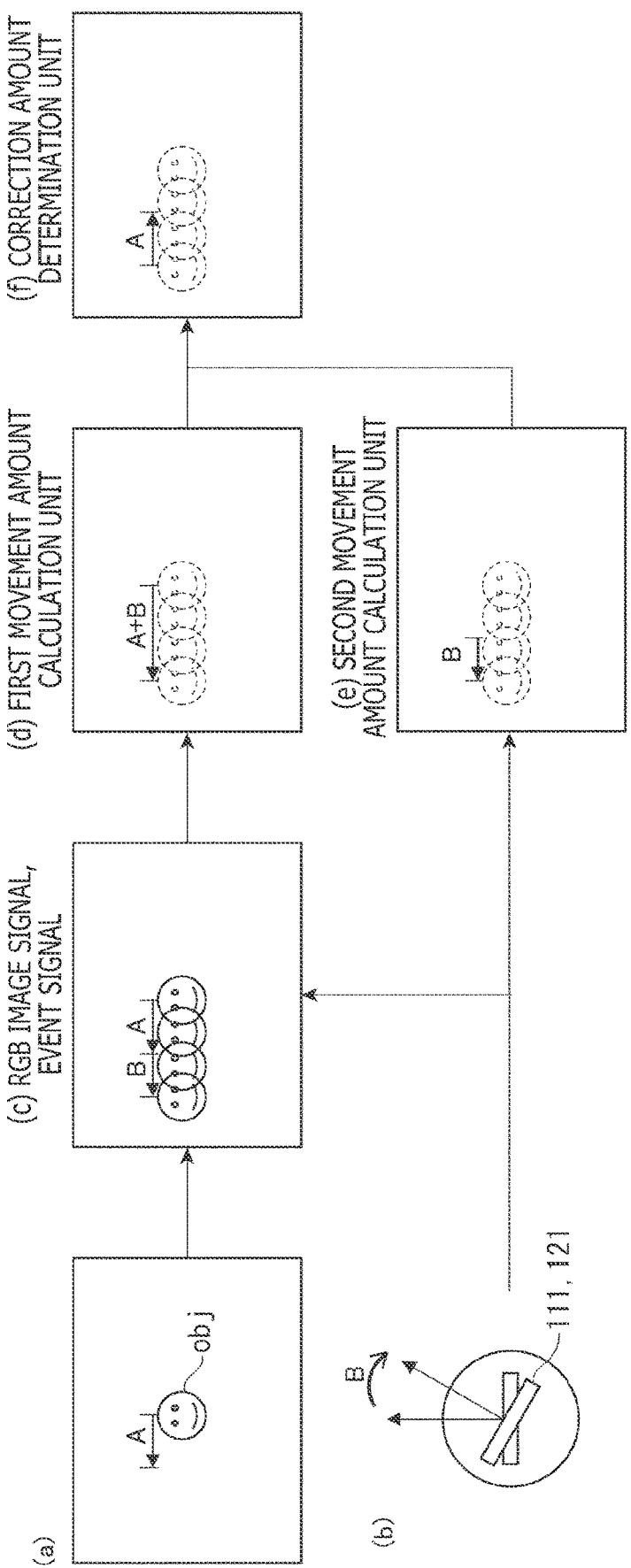
FIG. 2 is a diagram for schematically explaining a flow of processing according to the first embodiment of the invention.

FIG. 2 is a diagram for schematically explaining a concept of processing performed by the system 10 depicted in FIG. 1. According to the example depicted in the figure, the image sensor 111 and the sensor 121 are rotated by a quantity indicated by an arrow B as depicted in a part (b) with rightward rotation of the camera unit 130 according to a user operation performed on the operation unit 200, in a state where a blur has been produced in a stationary object obj by a quantity indicated by an arrow A as depicted in a part (a), regardless of an intention of the user.

In this case, as presented in a part (c), a blur corresponding to the arrow B is produced in addition to the blur corresponding to the arrow A in the RGB image signal 113 generated by the RGB camera 110 and the event signal 123 generated by the EDS 120. Accordingly, as presented in a part (d), the movement amount calculated by the first movement amount calculation unit 162 is equivalent to a movement amount corresponding to the arrows (A+B). Meanwhile, the movement amount calculated by the second movement amount calculation unit 164 is obtained in reference to information indicating the operation input made by the user to the operation unit 200, and hence is equivalent to a movement amount corresponding to the arrow B as presented in a part (e).

Moreover, the correction amount determination unit 165 determines the correction amount by subtracting the movement amount calculated by the second movement amount calculation unit 164 from the movement amount calculated by the first movement amount calculation unit 162. Accordingly, the correction amount is equivalent to a correction amount corresponding to the arrow A as presented in a part (f).

In addition, in a case where the correction amount is determined according to only the movement amount calculated by the first movement amount calculation unit 162 in the example depicted in FIG. 2, the intentional operation of the user (arrow B) is also considered as a blur. In this case, a correction amount corresponding to the arrow (A+B) is calculated. As a result, the object obj is pushed back toward the center of the RGB image signal 113 even after the rightward rotation of the camera unit 130 caused by the user operation on the operation unit 200.

Accordingly, inconsistency is produced between the actual user operation and the image generated and displayed. In this case, the user may feel uncomfortable or sick. This problem becomes more remarkable particularly in a case where an image is displayed in a large part of the visual field of the user, such as a case of VR (Virtual Reality) or AR (Augmented Reality).

According to the present embodiment, however, only the blur produced in the RGB image signal 113 (arrow A) independently of the intention of the user is corrected while the intentional operation by the user (arrow B) is being reflected and followed.

While described in FIG. 2 by way of example has been the case where the blur is produced in the horizontal direction of the stationary object obj for convenience of explanation, this description is applicable to a shift in other directions. Moreover, even during a shift of obj, the present invention is similarly applicable by excluding the moving object as described above, for example.

Figure 3:
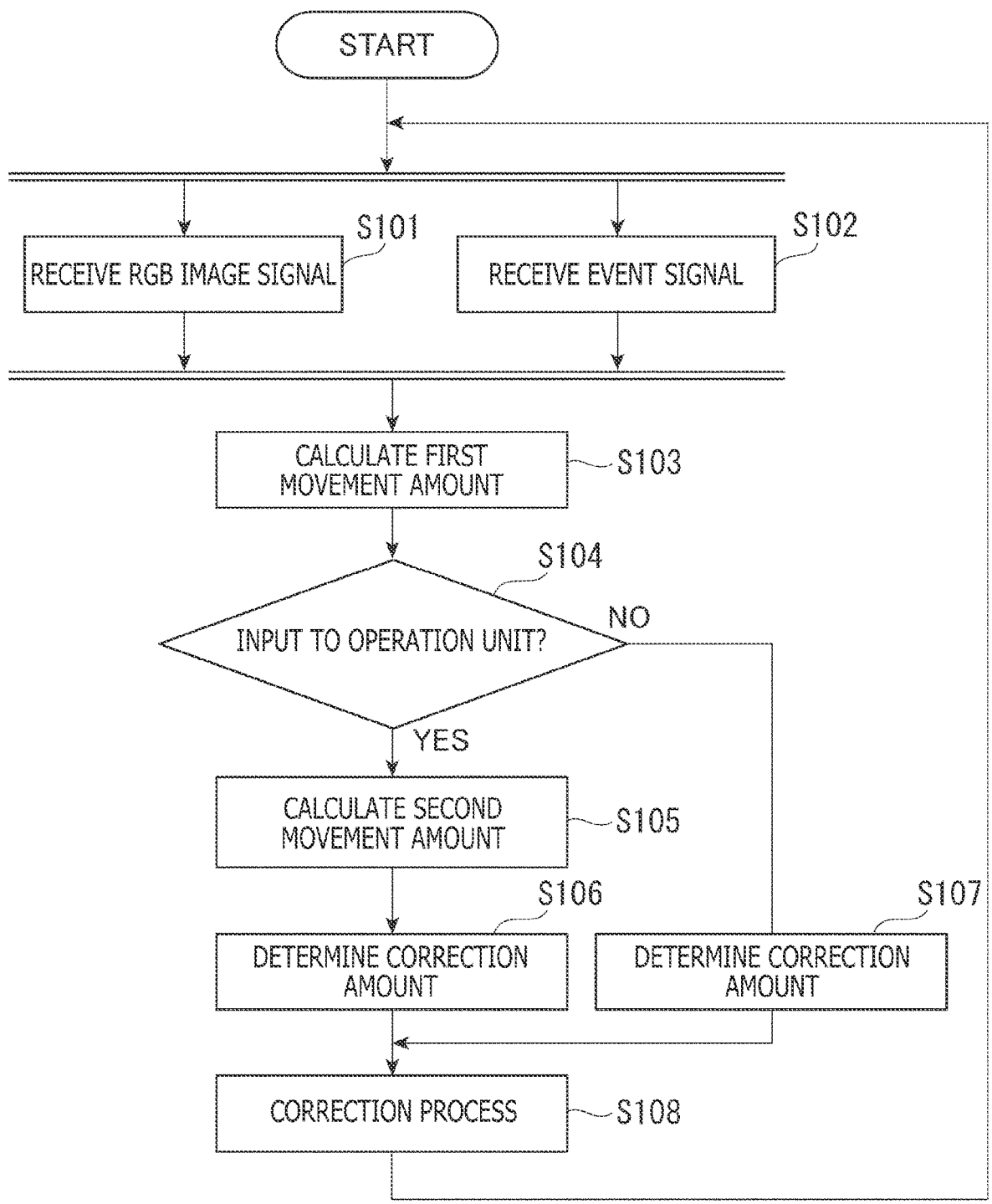
FIG. 3 is a flowchart presenting an example of processing performed in the first embodiment of the present invention.

FIG. 3 is a flowchart presenting an example of the processing according to the first embodiment of the present invention. According to the example depicted in the figure, the reception unit 161 of the information processing device 160 receives the RGB image signal 113 generated by the image sensor 111 (step S101), and receives the event signal 123 generated by the sensor 121 (step S102).

Thereafter, the first movement amount calculation unit 162 calculates a first movement amount according to the RGB image signal 113 and the event signal 123 (step S103).

In a case where the acceptance unit 163 accepts operation input made by the user to the operation unit 200 (YES in step S104), the second movement amount calculation unit 164 calculates a second movement amount in reference to information indicating the operation input (step S105). Then, the correction amount determination unit 165 determines a correction amount according to a calculation result of the first movement amount and a calculation result of the second movement amount (step S106).

On the other hand, in a case where the acceptance unit 163 does not accept operation input made by the user to the operation unit 200 (NO in step S104), the correction amount determination unit 165 determines a correction amount according to only the calculation result of the first movement amount (step S107).

Thereafter, the correction processing unit 166 executes the correction process for the RGB image signal 113 according to the correction amount determined in step S106 or step S107 (step S108).

According to the first embodiment of the present invention described above, image signals acquired by the image sensor 111 and the sensor 121 are received, and also operation input made by the user for driving the device carrying the image sensor 111 and the sensor 121 is accepted. Subsequently, movement amounts of the image sensor 111 and the sensor 121 in the entire angle of view are calculated according to the image signals and the operation input. Thereafter, the correction process is performed for an image constructed from the image signals, according to the calculated movement amounts. Accordingly, stable image formation is achievable in consideration of the movement of the image sensor according to the operation input made by the user. Moreover, a risk of discomfort and sickness given to the user during display of the formed images can be reduced.

This configuration achieves a preferred correction process without requiring such a configuration as a gyro sensor easily affected by a temperature characteristic, gravity, magnetism, or the like and a gimbal mechanism subjected to restrictions in terms of cost and size, for example.

Moreover, according to the first embodiment of the present invention, the operation input is operation input made by the user for driving a portion that is included in the robot body 100 and that is capable of simultaneously displacing and rotating the image sensor 111 and the sensor 121 integrated into one body. Accordingly, only a blur produced independently of the intention of the user can be corrected while the intentional operation by the user is being reflected and followed.

Moreover, according to the first embodiment of the present invention, both the EDS 120 and the RGB camera 110 are provided. A movement amount in the entire angle of view is calculated according to the event signal 123 generated by the EDS 120 and the operation input. The correction process is performed for an image constructed from the RGB image signal 113 generated by the RGB camera 110, according to the calculated movement amount. Accordingly, the correction amount can be calculated at high speed and with accuracy by using the event signal 123 that is generated at high speed and that corresponds to the movement amount itself. In addition, the correction process can be performed for the image constructed from the RGB image signal 113 that has information sufficient for construction of the image. Accordingly, a preferred process utilizing respective characteristics of the RGB image signal 113 and the event signal 123 is achievable.

Second Embodiment

Figure 4:
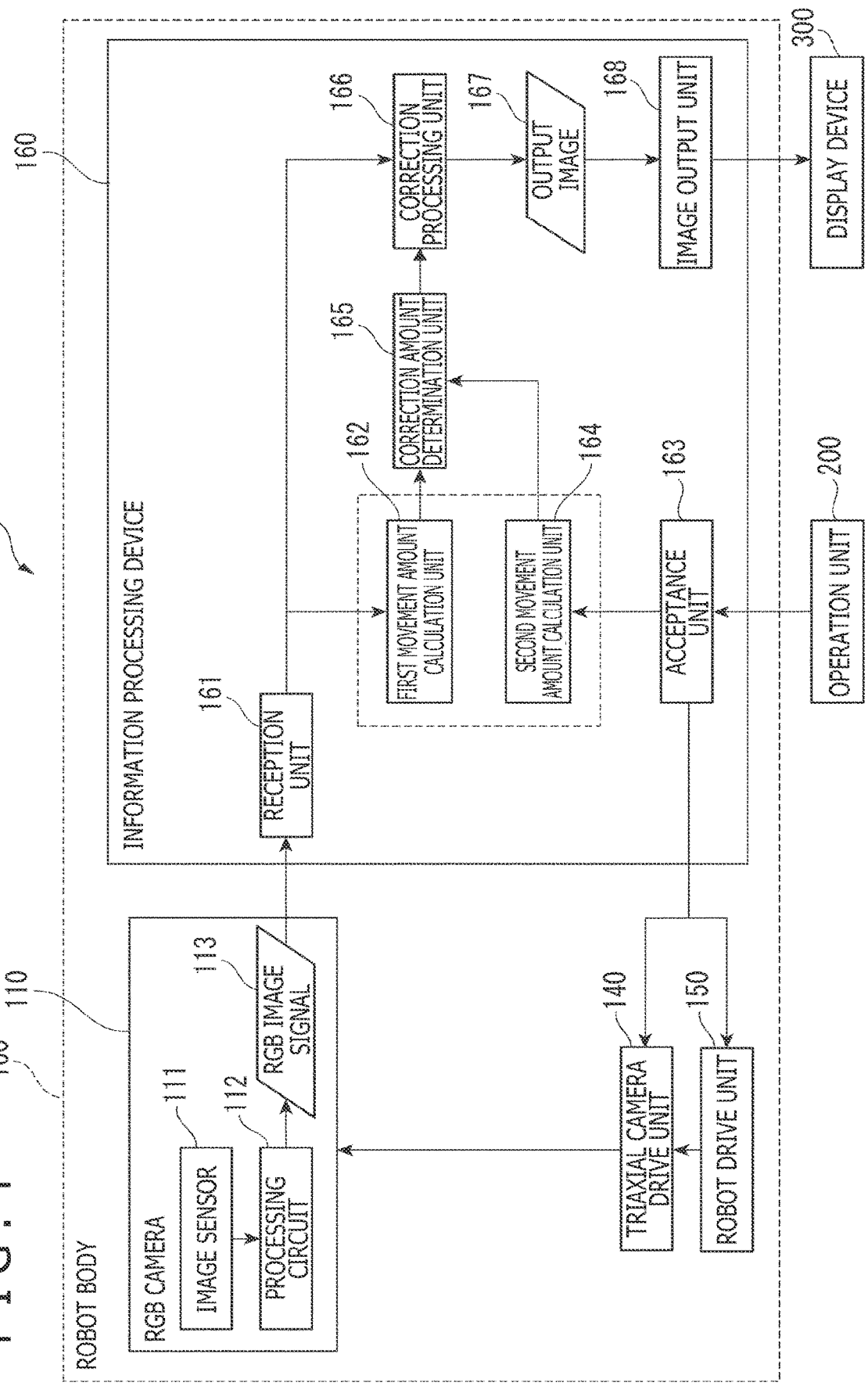
FIG. 4 is a block diagram depicting a schematic configuration of a system according to a second embodiment of the present invention.

FIG. 4 is a block diagram depicting a schematic configuration of a system according to a second embodiment of the present invention. While described in the first embodiment has been the example of the system 10 including the camera unit 130 including the RGB camera 110 and the EDS 120, a system 20 according to the second embodiment includes only the RGB camera 110. In FIG. 4, constituent elements having functional configurations substantially identical to those in FIG. 1 are given identical reference signs.

According to the example depicted in FIG. 4, the reception unit 161 receives only the RGB image signal 113, and the first movement amount calculation unit 162 calculates a movement amount in the entire angle of view according to only the RGB image signal 113.

In this example, advantageous effects similar to those of the first embodiment can be offered by calculating the movement amount of the image sensor 111 of the RGB camera 110 in the entire angle of view with use of the first movement amount calculation unit 162.

Third Embodiment

Figure 5:
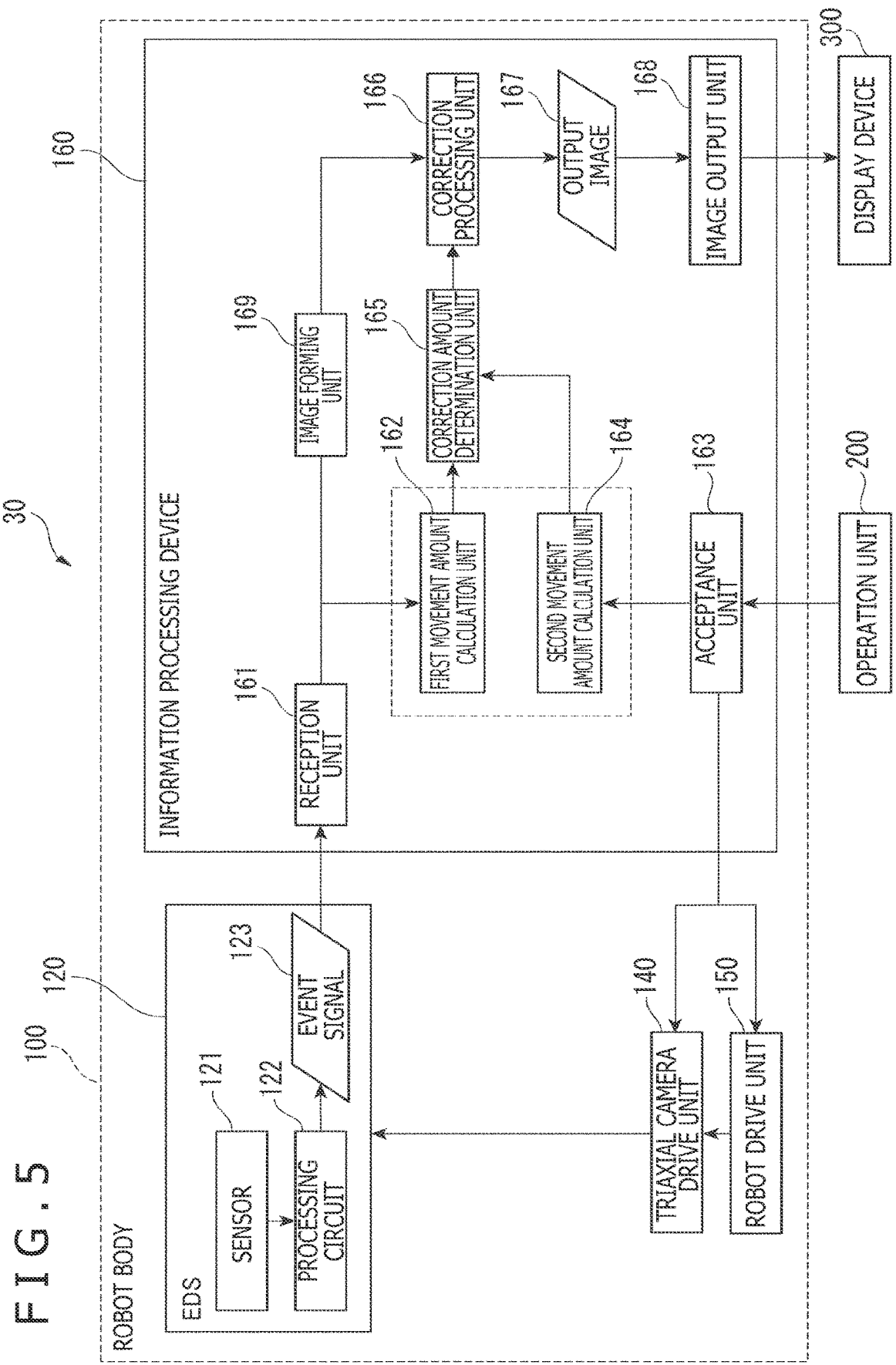
FIG. 5 is a block diagram depicting a schematic configuration of a system according to a third embodiment of the present invention.

FIG. 5 is a block diagram depicting a schematic configuration of a system according to a third embodiment of the present invention. While described in the first embodiment has been the example of the system 10 including the camera unit 130 including the RGB camera 110 and the EDS 120, a system 30 according to the third embodiment includes only the EDS 120. In FIG. 5, constituent elements having functional configurations substantially identical to those in FIG. 1 are given identical reference signs.

According to the example depicted in FIG. 5, the reception unit 161 receives only the event signal 123, and the first movement amount calculation unit 162 calculates a movement amount in the entire angle of view according to only the event signal 123.

In this example, it is only required to calculate the movement amount of the sensor 121 of the EDS 120 in the entire angle of view by the first movement amount calculation unit 162. Note that the system 30 including only the EDS 120 further includes an image forming unit 169 to construct an image expressing an event detection result as pixel values of respective pixels from the event signal 123 received by the reception unit 161, and performs the correction process for the constructed image by the correction processing unit 166. In this manner, advantageous effects similar to those of the first and second embodiments can be offered. Note that various known configurations may be applied to the process for constructing the image from the event signal 123.

In addition, according to the system 10, the system 20, and the system 30 described in the first embodiment to the third embodiment, the triaxial camera drive unit 140 for driving the camera unit 130 and the robot drive unit 150 for driving the entirety of the robot body 100 have been presented as driving units by way of example. However, the present invention is not limited to this example. The respective units may be configured to be driven by a larger number of drive units, or may be driven by a smaller number of drive units (e.g., a driving unit for driving only the camera unit 130).

Moreover, according to the system 10, the system 20, and the system 30 described in the first embodiment to the third embodiment by way of example, the head portion carrying the camera unit 130 is displaced or rotated by the triaxial camera drive unit 140. However, the present invention is not limited to this example. Providable is such a drive unit capable of driving only a portion that is included in the entire apparatus and that is capable of simultaneously displacing and rotating the image sensors (image sensor 111 and sensor 121) integrated into one body. For example, in a case where the image sensor is mounted on a portion protruded from a part corresponding to the head portion, a drive unit capable of driving only the protruded portion may be provided. Moreover, for example, providable is such a drive unit capable of driving only a device carrying the camera unit 130 in a plurality of devices constituting the apparatus body.

Further, according to the system 10, the system 20, and the system 30 described in the first embodiment to the third embodiment by way of example, the robot body 100 is a robot imitating a four-legged creature. However, the present invention is not limited to this example. The present invention can possibly be similarly applied to apparatuses other than the robot imitating a four-legged creature as long as at least either the position or the imaging direction of the image sensor is changeable in a case of a possibility of a blur produced by a shift or driving of a body corresponding to the robot.

For example, the robot body 100 may be a two-legged robot imitating a human model, a multi-legged robot such as an animal model, or a vehicle-type robot. Moreover, the present invention is applicable to an apparatus having a flying function such as a drone, or an apparatus shiftable in or on the water such as an underwater drone. Furthermore, the present invention is also applicable to an apparatus capable of changing at least either a position or an imaging direction of an image sensor while visually checking an image formed by the image sensor, such as an endoscope.

Fourth Embodiment

Figure 6:
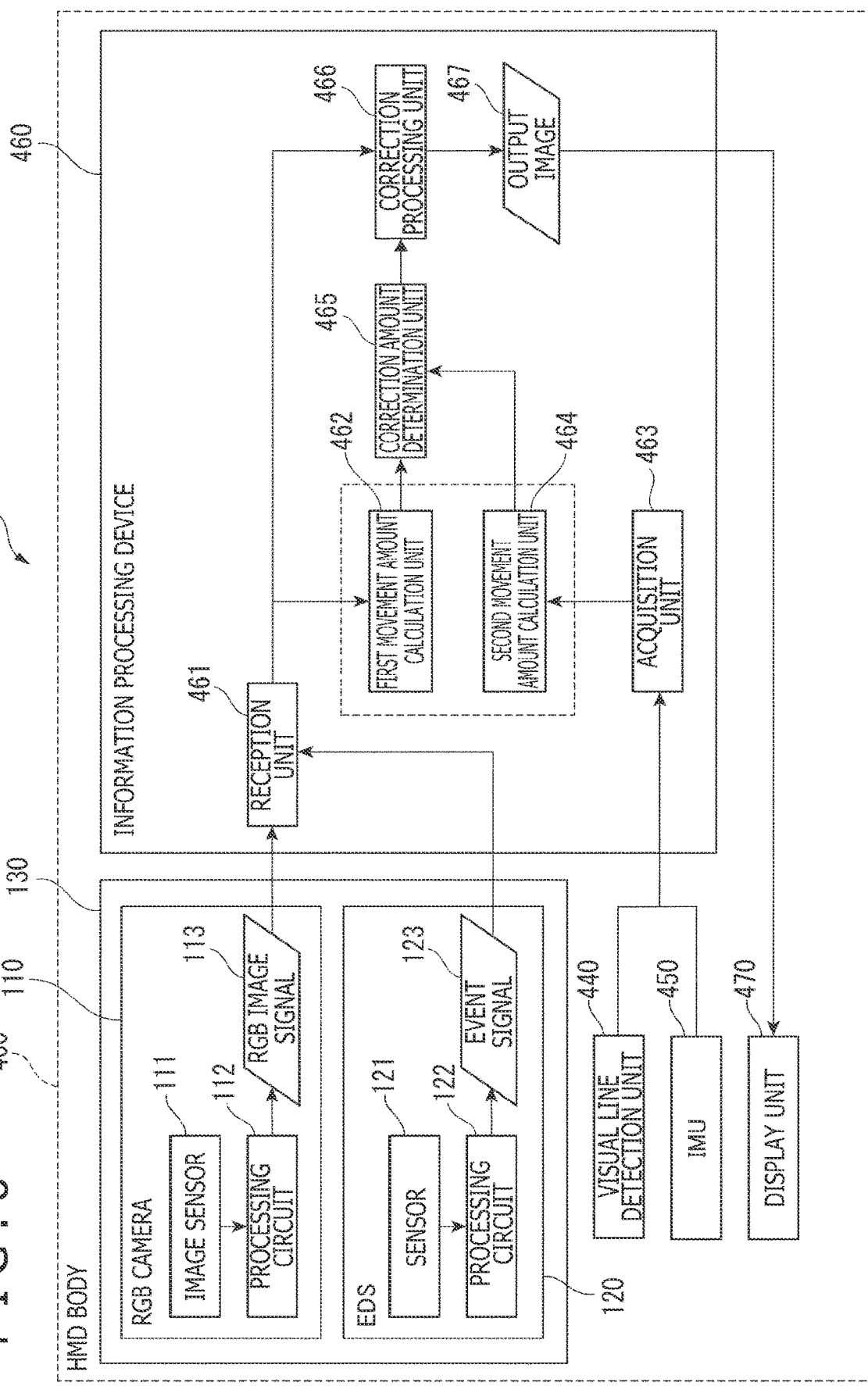
FIG. 6 is a block diagram depicting a schematic configuration of a system according to a fourth embodiment of the present invention.

FIG. 6 is a block diagram depicting a schematic configuration of a system according to a fourth embodiment of the present invention. A system 40 according to the fourth embodiment is equivalent to the system 10 according to the first embodiment applied to an attachment type device such as an HMD.

The system 40 includes an HMD body 400, and is attachable to the body of the user, more specifically, the head of the user, via an unillustrated attachment unit.

The HMD body 400 includes the camera unit 130 similar to the camera unit 130 of the first embodiment, and further includes a visual line detection unit 440 for detecting a visual line of the user, an IMU (Inertial Measurement Unit) 450 which is a sensor for detecting a posture of the camera unit 130 itself, an information processing device 460, and a display unit 470.

The visual line detection unit 440 detects a visual line of the user, and outputs the detected visual line to the information processing device 460. Detection of the visual line by the visual line detection unit 440 may be performed in any manner. For example, an IR (Infrared) sensor may be closely disposed around the eyes of the user to detect the visual line of the user according to output from the IR sensor, or may detect the visual line according to output from a sensor similar to the sensor 121 of the EDS 120 instead of or in addition to the IR sensor.

The IMU 450 is an inertial sensor which detects a posture of the camera unit 130 itself, more specifically, postures of the image sensor 111 of the RGB camera 110 and the sensor 121 of the EDS 120. The IMU 450 acquires three-dimensional posture information associated with the image sensor 111 and the sensor 121 in a predetermined cycle or at a predetermined timing. This posture information can be deemed to be information indicating a movement of the head of the user. The IMU 450 outputs this information indicating the movement of the head of the user to the information processing device 460.

The information processing device 460 includes a function of an acquisition unit 463 in addition to respective functions of a reception unit 461, a first movement amount calculation unit 462, a second movement amount calculation unit 464, a correction amount determination unit 465, and a correction processing unit 466 similar to the reception unit 161, the first movement amount calculation unit 162, the second movement amount calculation unit 164, the correction amount determination unit 165, and the correction processing unit 166 according to the first embodiment, respectively. Further described below will be the functions of the respective units concerning points different from the corresponding points of the first embodiment.

The acquisition unit 463 acquires information detected by the visual line detection unit 440 and associated with a visual line of the user and information acquired by the IMU 450 that indicates a movement of the head of the user. Each of these items of information is information indicating a movement of the user that causes a shift of the camera unit 130. The acquisition unit 463 supplies the thus acquired information indicating the movement of the user to the second movement amount calculation unit 464.

The second movement amount calculation unit 464 calculates movement amounts of the image sensor 111 and the sensor 121 produced by the movement of the user, in reference to the information acquired by the acquisition unit 463 that indicates the movement of the user.

According to general human characteristics, at the time of changing a visual field by turning the neck, a human first moves the eyeballs of the eyes to move the visual line in a corresponding direction and then moves the neck. Accordingly, the second movement amount calculation unit 464 identifies a movement of the neck of the user in reference to information detected by the visual line detection unit 440 and associated with the visual line of the user, and determines that this movement of the user is an intentional movement in a case where the information acquired by the IMU 450 that indicates the movement of the head of the user indicates a shift in the moving direction of the neck. In this case, the second movement amount calculation unit 464 calculates movement amounts of the image sensor 111 and the sensor 121 in reference to the information acquired by the IMU 450 that indicates the movement of the head of the user. For example, the camera unit 130 rotates in association with turn of the neck of the user. In this case, the image sensor 111 and the sensor 121 are similarly rotated basically by the same amount and in the same direction. This is also applicable to the case of a shift.

Note that the movement amount calculated by the second movement amount calculation unit 464 is not limited to the above example. For example, other information may be applied instead of or in addition to the information detected by the visual line detection unit 440 and associated with the visual line of the user and the information acquired by the IMU 450 that indicates the movement of the head of the user. Moreover, for example, the movement amount calculated by the second movement amount calculation unit 464 may be changed according to movement conditions of the HMD body 400. For example, in a case where stable image formation is highly likely to become considerably difficult even at the time of an intentional movement of the user, the second movement amount calculation unit 464 may be configured not to calculate the movement amount or to reduce the calculated movement amount.

The correction amount determination unit 465 determines a correction amount of a correction process to be performed by the correction processing unit 466 as described below, by using the movement amounts calculated by the first movement amount calculation unit 462 and the second movement amount calculation unit 464.

The correction amount determination unit 465 first determines whether or not any movement has been made by the user, in reference to the movement amount calculated by the second movement amount calculation unit 464. This determination can be made by comparison with a predetermined threshold, for example.

Thereafter, when it is determined that any movement has been made by the user, the correction amount determination unit 465 determines a correction amount by subtracting the movement amounts of the image sensor 111 and the sensor 121 calculated by the second movement amount calculation unit 464 from the movement amounts of the image sensor 111 and the sensor 121 in the entire angle of view calculated by the first movement amount calculation unit 462, in a manner similar to the manner of the correction amount determination unit 165 of the first embodiment. Specifically, the correction amount determination unit 465 determines the correction amount by reducing (or cancelling depending on cases) a movement amount corresponding to a movement of the user that cases a shift of the camera unit 130 in the movement amounts of the image sensor 111 and the sensor 121 in the entire angle of view calculated by the first movement amount calculation unit 462. Thereafter, the determined correction amount is applied to the correction to allow correction of only a blur produced in the RGB image signal 113 independently of the intention and the movement of the user while the movement by the user that causes the shift of the camera unit 130 is being reflected and followed.

In addition, at the time of reduction of the movement amounts of the image sensor 111 and the sensor 121 in the entire angle of view calculated by the first movement amount calculation unit 462, for example, the correction amount determination unit 465 may achieve this reduction by simply adding or subtracting a rotation amount for each rotation direction to and from the movement amounts of the image sensor 111 and the sensor 121 in the entire angle of view calculated by the first movement amount calculation unit 462 and the movement amounts of the image sensor 111 and the sensor 121 calculated by the second movement amount calculation unit 464, or by weighting the respective movement amounts in an appropriate manner. This is also applicable to the case of a shift.

As described above, when it is determined that any movement has been made by the user, according to the movement amount calculated by the second movement amount calculation unit 464, the correction amount determination unit 465 determines the correction amount of the correction process to be performed by the correction processing unit 466, according to the movement amounts calculated by the first movement amount calculation unit 462 and the second movement amount calculation unit 464, and supplies the determined correction amount to the correction processing unit 466. On the other hand, when it is determined that no movement has been made by the user, according to the movement amount calculated by the second movement amount calculation unit 464, the correction amount determination unit 465 determines the correction amount of the correction process to be performed by the correction processing unit 466, according to only the movement amount calculated by the first movement amount calculation unit 462, and supplies the determined correction amount to the correction processing unit 466.

Similarly to the correction processing unit 466 of the first embodiment, the correction processing unit 466 performs the correction process based on the correction amount determined by the correction amount determination unit 465 for the RGB image signal 113 received by the reception unit 461 and forms an output image 467. The output image 467 is an image formed by designating a blur produced by the movement by the user that causes the shift of the camera unit 130 as a blur to be excluded from correction targets and excluding this blur and by designating a blur produced by shaking of the HMD body 400 caused by the movement of the user and correcting this blur. The correction processing unit 466 outputs the formed output image 467 to the display unit 470.

The display unit 470 is disposed at a position close to the eyes of the user to display the output image 467. For example, the display unit 470 includes a display element such as an LCD (Liquid Crystal Display) and an organic EL (Electro Luminescence) and an optical device such as a lens. The display element may be either a transmission type display element, or a non-transmission type display element. Moreover, an attachment type device such as an AR glass and an MR (Mixed Reality) glass is available as the HMD body 400.

Figure 7:
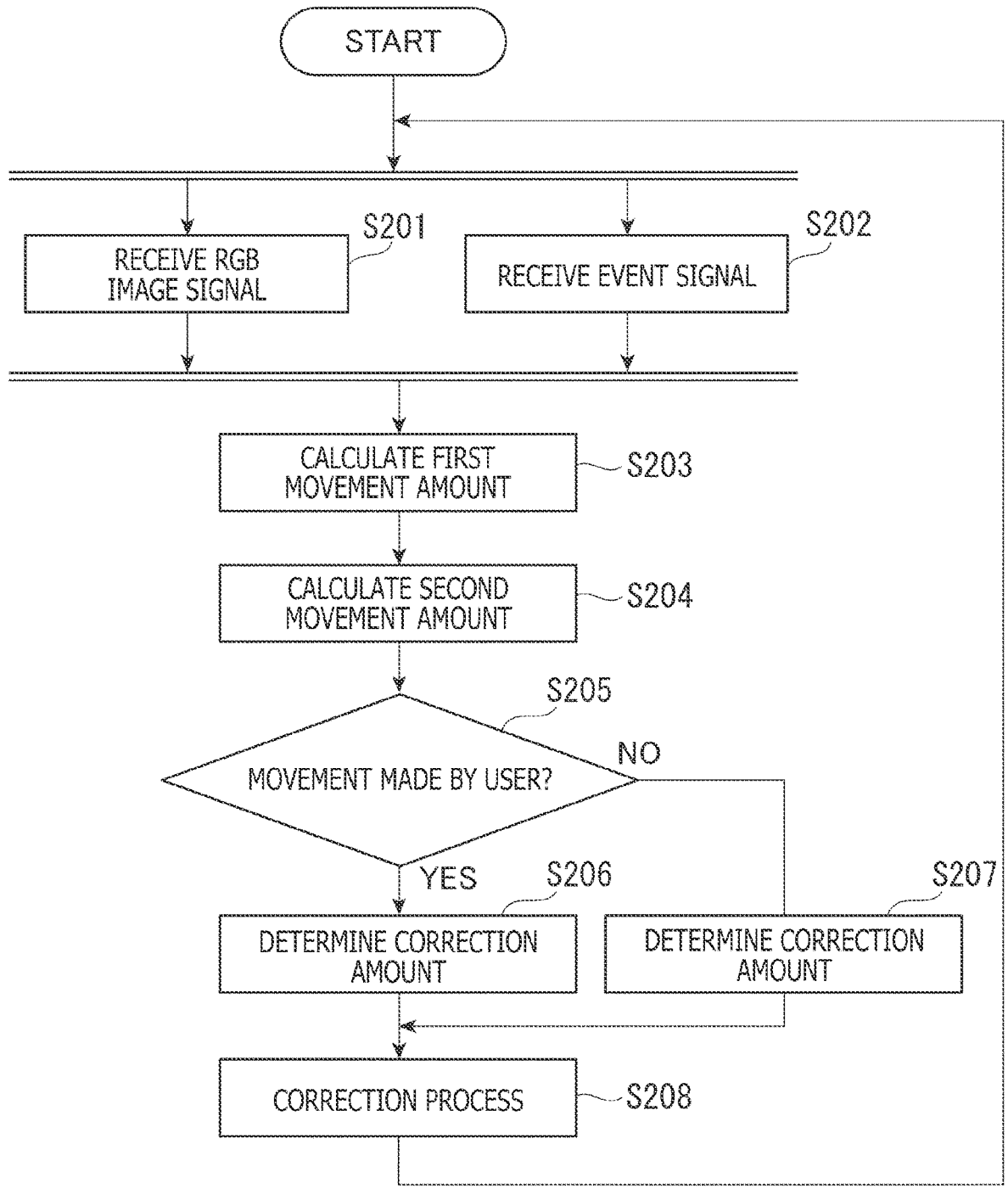
FIG. 7 is a flowchart presenting an example of processing performed in the fourth embodiment of the present invention.

FIG. 7 is a flowchart presenting an example of the processing performed in the fourth embodiment of the present invention. According to the example depicted in the figure, the reception unit 461 of the information processing device 460 receives the RGB image signal 113 generated by the image sensor 111 (step S201), and receives the event signal 123 generated by the sensor 121 (step S202).

Thereafter, the first movement amount calculation unit 462 calculates the first movement amount, according to the RGB image signal 113 and the event signal 123 (step S203), while the second movement amount calculation unit 464 calculates the second movement amount, in reference to information acquired by the acquisition unit 463 (step S204). When the correction amount determination unit 465 determines that any movement has been made by the user (YES in step S205), a correction amount is determined according to a calculation result of the first movement amount and a calculation result of the second movement amount (step S206).

On the other hand, when the correction amount determination unit 465 determines that no movement has been made by the user (NO in step S205), the correction amount is determined according to only the calculation result of the first movement amount (step S207).

Thereafter, the correction processing unit 466 executes a correction process for the RGB image signal 113 according to the correction amount determined in step S206 or step S207 (step S208).

According to the fourth embodiment of the present invention described above, information indicating a movement of the user that causes a shift of the HMD body 400 is acquired, and movement amounts of the image sensor 111 and the sensor 121 in the entire angle of view are calculated according to an image signal and the information indicating the movement of the user. Accordingly, only a blur produced in the RGB image signal 113 independently of the intention of the user can be corrected while the movement of the user is being reflected and followed. This advantageous effect is useful particularly in a case where the user wearing the HMD body 400 has shifted, for example.

Note that the system 20 described in the second embodiment and the system 30 described in the third embodiment are similarly applicable to an attachment type device such as an HMD.

Moreover, each of the system 10, the system 20, the system 30, and the system 40 described in the first embodiment to the fourth embodiment may be configured to further include a sensor other than the image sensor 111 of the RGB camera 110 and the sensor 121 of the EDS 120. For example, whether the robot body 100 itself has been shifted may be detected by a gyro sensor disposed near the image sensor 111 and the sensor 121 in the first embodiment, to improve control stability. In this case, neither a highly accurate gyro sensor nor a calculation process for achieving measurement of ego-motion is required. Whether the robot body 100 itself has been shifted is detectable by a threshold process using an acceleration component of the gyro sensor. This is also applicable to the second embodiment to the fourth embodiment.

Further, each of the system 10, the system 20, the system 30, and the system 40 described in the first embodiment to the fourth embodiment may be mounted on a single device, or distributed and mounted on a plurality of devices. For example, in the first embodiment to the third embodiment, the entirety of the information processing device 160 may be mounted inside the robot body 100, or at least a part of the information processing device 160 may be separated and mounted on a server apparatus. In addition, for example, a part or the entirety of the information processing device 460 in the fourth embodiment may be mounted outside the HMD body 400.

Besides, assuming a use application such as data analysis for the purpose of studies or investigations, for example, applicable is such a configuration which performs an ex-post correction process after the RGB image signal 113 and the event signal 123 and information indicating operation input made by the user to the operation unit 200 or information indicating a movement of the user are stored as associated data in time series.

While several embodiments of the present invention have been described above in detail with reference to the accompanying drawings, the present invention is not limited to these examples. It is obvious that various modification examples and correction examples within the scope of the technical spirit described in the claims may be conceived of by those having ordinary knowledge in the technical field to which the present invention belongs. Needless to say, it is understood that these examples also belong to the technical scope of the present invention.

REFERENCE SIGNS LIST 10, 20, 30, 40: System
100: Robot body
110, 410: RGB camera
111: Image sensor
112, 122: Processing circuit
113: RGB image signal
120: EDS
121: Sensor
123: Event signal
130: Camera unit
140: Triaxial camera drive unit
150: Robot drive unit
160, 460: Information processing device
161, 461: Reception unit
162, 462: First movement amount calculation unit
163: Acceptance unit
164, 464: Second movement amount calculation unit
165, 465: Correction amount determination unit
166, 466: Correction processing unit
167, 467: Output image
168: Image output unit
169: Image forming unit
200: Operation unit
300: Display device
400: HMD body
440: Visual line detection unit
450: IMU
470: Display unit

The invention claimed is:

1. An image processing apparatus comprising:
a reception unit that receives an image signal acquired by an image sensor;
an acceptance unit that accepts operation input made by a user for driving a device carrying the image sensor;
a calculation unit that calculates a movement amount of the image sensor in an entire angle of view, according to the image signal and the operation input; and
a correction processing unit that performs a correction process for an image constructed from the image signal, according to the movement amount,
wherein the calculation unit calculates a first movement amount according to the image signal, calculates a second movement amount according to the operation input, and calculates the movement amount in the entire angle of view by subtracting the second movement amount from the first movement amount.

2. The image processing apparatus according to claim 1, wherein the image sensor includes an event-driven vision sensor that asynchronously generates the image signal when an intensity change of light entering for each pixel is detected.

3. The image processing apparatus according to claim 2, wherein
the image sensor further includes a camera that generates the image signal by synchronously scanning all pixels at a predetermined timing,
the reception unit receives the image signals from both the vision sensor and the camera,
the calculation unit calculates the movement amount in the entire angle of view according to at least the image signal generated by the vision sensor and the operation input, and
the correction processing unit performs the correction process for the image constructed from the image signal generated by the camera, according to the movement amount.

4. The image processing apparatus according to claim 2, wherein the correction processing unit constructs the image by performing an interpolation process for the image signal generated by the vision sensor, and performs the correction process for the constructed image.

5. The image processing apparatus according to claim 1, wherein the operation input is operation input made by the user for driving a portion that is included in the device and that is capable of simultaneously displacing and rotating the image sensor integrated into one body.

6. The image processing apparatus according to claim 1, wherein
the device is a device attachable to a head of the user, and
the acquisition unit acquires information indicating a movement of the head of the user as the information indicating the movement of the user.

7. The image processing apparatus according to claim 6, wherein the acquisition unit further acquires information associated with a visual line of the user as the information indicating the movement of the user.

8. An image processing apparatus comprising:
a reception unit that receives an image signal acquired by an image sensor;
an acquisition unit that acquires information indicating a movement of a user that causes a shift of a device carrying the image sensor and attachable to the body of the user;
a calculation unit that calculates a movement amount of the image sensor in an entire angle of view, according to the image signal and the information indicating the movement of the user; and
a correction processing unit that performs a correction process for an image constructed from the image signal, according to the movement amount,
wherein the calculation unit calculates a first movement amount according to the image signal, calculates a second movement amount according to the information indicating the movement of the user, and calculates the movement amount in the entire angle of view by subtracting the second movement amount from the first movement amount.

9. The image processing apparatus according to claim 8, wherein the image sensor includes an event-driven vision sensor that asynchronously generates the image signal when an intensity change of light entering for each pixel is detected.

10. The image processing apparatus according to claim 9, wherein
the image sensor further includes a camera that generates the image signal by synchronously scanning all pixels at a predetermined timing,
the reception unit receives the image signals from both the vision sensor and the camera,
the calculation unit calculates the movement amount in the entire angle of view according to at least the image signal generated by the vision sensor and the information indicating the movement of the user, and
the correction processing unit performs the correction process for an image constructed from the image signal generated by the camera, according to the movement amount.

11. The image processing apparatus according to claim 9, wherein the correction processing unit constructs the image by performing an interpolation process for the image signal generated by the vision sensor, and performs the correction process for the constructed image.

12. A system comprising:
an image sensor that acquires an image signal;
an acceptance unit that accepts operation input made by a user for driving a device carrying the image sensor;
a drive unit that drives the device carrying the image sensor, according to the operation input; and
a terminal apparatus,
the terminal apparatus including
a reception unit that receives the image signal,
a calculation unit that calculates a movement amount of the image sensor in an entire angle of view, according to the image signal and the operation input, and
a correction processing unit that performs a correction process for an image constructed from the image signal, according to the movement amount,
wherein the calculation unit calculates a first movement amount according to the image signal, calculates a second movement amount according to the operation input, and calculates the movement amount in the entire angle of view by subtracting the second movement amount from the first movement amount.

13. A system comprising:
an image sensor that acquires an image signal;
an acquisition unit that acquires information indicating a movement of a user that causes a shift of a device carrying the image sensor and attachable to the body of the user; and
a terminal apparatus,
the terminal apparatus including
a reception unit that receives the image signal,
a calculation unit that calculates a movement amount of the image sensor in an entire angle of view, according to the image signal and the information indicating the movement of the user, and
a correction unit that performs a correction process for an image constructed from the image signal, according to the movement amount,
wherein the calculation unit calculates a first movement amount according to the image signal, calculates a second movement amount according to the information indicating the movement of the user, and calculates the movement amount in the entire angle of view by subtracting the second movement amount from the first movement amount.

14. An image processing method comprising:
receiving an image signal acquired by an image sensor;
accepting operation input made by a user for driving a device carrying the image sensor;
calculating a movement amount of the image sensor in an entire angle of view according to the image signal and the operation input; and
performing a correction process for an image constructed from the image signal, according to the movement amount,
wherein the calculating includes calculating a first movement amount according to the image signal, calculating a second movement amount according to the operation input, and calculating the movement amount in the entire angle of view by subtracting the second movement amount from the first movement amount.

15. An image processing method comprising:
receiving an image signal acquired by an image sensor;
acquiring information indicating a movement of a user that causes a shift of a device carrying the image sensor and attachable to the body of the user;
calculating a movement amount of the image sensor in an entire angle of view according to the image signal and the information indicating the movement of the user; and
performing a correction process for an image constructed from the image signal, according to the movement amount,
wherein the calculation unit calculates a first movement amount according to the image signal, calculates a second movement amount according to the information indicating the movement of the user, and calculates the movement amount in the entire angle of view by subtracting the second movement amount from the first movement amount.

16. A non-transitory, computer readable storage medium containing an image processing program, which when executed by a computer, causes the computer to perform an image processing method by carrying out actions, comprising:

receiving an image signal acquired by an image sensor;
accepting operation input made by a user for driving a device carrying the image sensor;
calculating a movement amount of the image sensor in an entire angle of view according to the image signal and the operation input; and
performing a correction process for an image constructed from the image signal, according to the movement amount,
wherein the calculating includes calculating a first movement amount according to the image signal, calculating a second movement amount according to the operation input, and calculating the movement amount in the entire angle of view by subtracting the second movement amount from the first movement amount.

17. A non-transitory, computer readable storage medium containing an image processing program, which when executed by a computer, causes the computer to perform an image processing method by carrying out actions, comprising:

receiving an image signal acquired by an image sensor;
acquiring information indicating a movement of a user that causes a shift of a device carrying the image sensor and attachable to the body of the user;
calculating a movement amount of the image sensor in an entire angle of view according to the image signal and the information indicating the movement of the user; and
performing a correction process for an image constructed from the image signal, according to the movement amount,
wherein the calculation unit calculates a first movement amount according to the image signal, calculates a second movement amount according to the information indicating the movement of the user, and calculates the movement amount in the entire angle of view by subtracting the second movement amount from the first movement amount.

* * * * *